No. 655,212. Patented Aug. 7, 1900.
W. B. ERB.
LUBRICATOR AND PISTON ROD PACKING.
(Application filed Apr. 19, 1899.)
(No Model.)
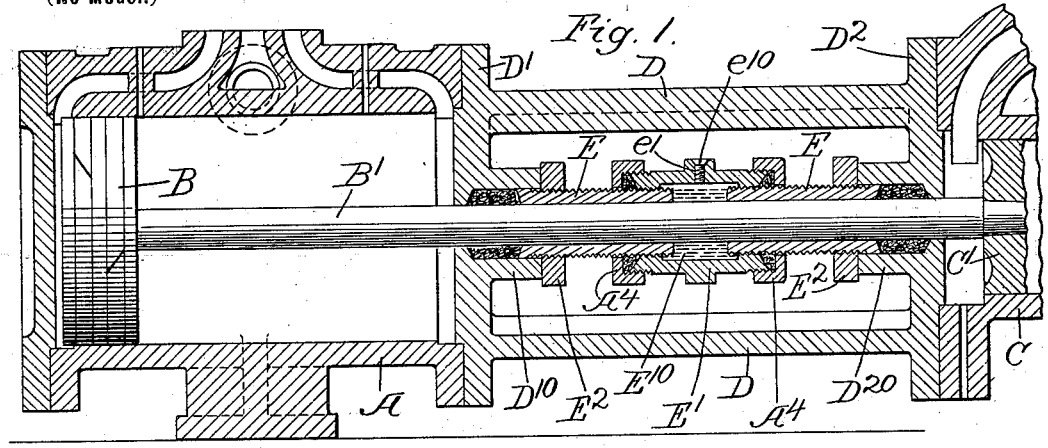
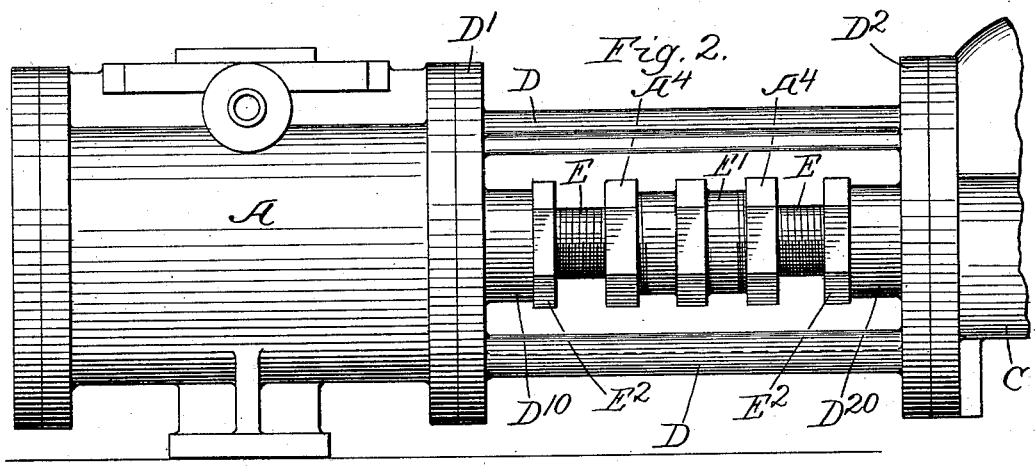
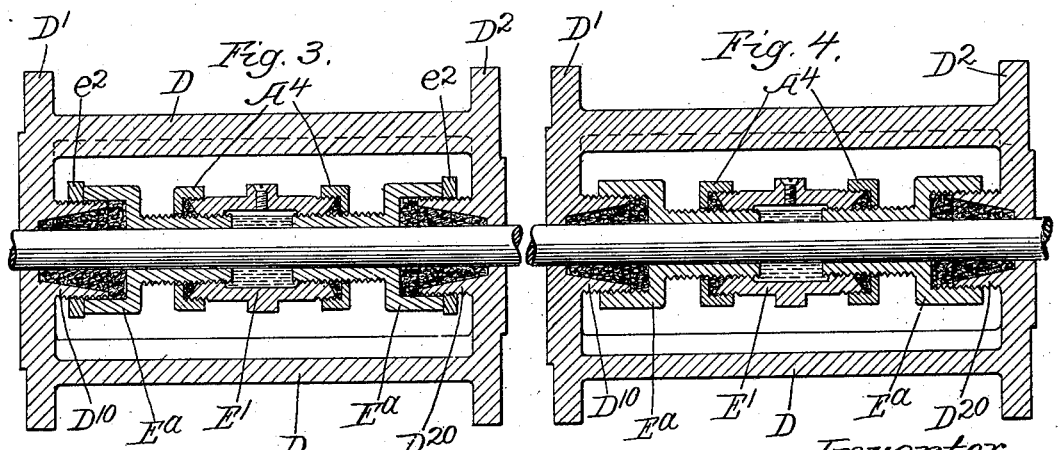
Witnesses.
Edward T. Wray.
Jean Elliott.
Inventor.
William B. Erb
by Burton and Burton
his attys

UNITED STATES PATENT OFFICE.

WILLIAM B. ERB, OF CHICAGO, ILLINOIS.

LUBRICATOR AND PISTON-ROD PACKING.

SPECIFICATION forming part of Letters Patent No. 655,212, dated August 7, 1900.

Original application filed December 10, 1897, Serial No. 661,422. Divided and this application filed April 19, 1899. Serial No. 713,685. (No model.)

*To all whom it may concern:*

Be it known that I, WILLIAM B. ERB, a citizen of the United States, residing at Chicago, county of Cook, and State of Illinois, have invented certain new and useful Improvements in a Lubricator and Piston-Rod Packing for Air-Compressor, Steam-Pump, or other Direct-Acting Engines, which are fully set forth in the following specification, reference being had to the accompanying drawings, forming a part thereof.

This invention is a division of my application, Serial No. 661,422, for "steam-motor," filed December 10, 1897.

In the drawings I have illustrated the application of my invention to a steam-pump.

Figure 1 is an axial section through the steam-cylinder and water-cylinder of a steam-pump having my improvements, parts adjacent to the steam-cylinder being removed and the water-cylinder being partly broken away. Fig. 2 is a side elevation. Fig. 3 is a detail axial section of the proximate portions of the two cylinders and the piston-rod and other parts located between them, showing a modified form of the stuffing-box and rod-housing connections between the cylinder-heads. Fig. 4 is a section similar to Fig. 3, showing further modification.

In the drawings, A is the steam-cylinder. B is the piston; B' the piston rod or stem. C' is the pump-piston. C is the pump body or cylinder. D is a rigid frame comprising the proximate heads or ends of the cylinders and serving to connect the two together and having guide-bearing bosses $D^{10}$ $D^{20}$ on the engine and pump cylinder heads D' and $D^2$, respectively, for the piston-rod B'.

E E are exteriorly-threaded sleeves on the piston-rod B', connected by a right-and-left nut E' and extending into the bosses $D^{10}$ $D^{20}$ on the cylinder-heads, respectively, through which the piston-rod plays and in which there are formed cavities to retain the packing. Such bosses constitute each one member of a two-part stuffing-box, the other part being the threaded sleeve E, which protrudes into the cavity of the boss and bears against the packing therein.

$E^2$ $E^2$ are stop-nuts, which are run onto the threaded sleeves before they are connected by the coupling E' and operate to limit the thrust of said sleeves into the stuffing-boxes, respectively, the nuts coming into contact with the outer ends of the bosses. The two sleeves and their coupling E' together constitute a complete housing for the piston-rod between the two cylinder-heads, and the space between the ends of the sleeves within the coupling constitutes an oil-chamber $E^{10}$, which may be filled with oil through an aperture $e'$, which is closed by a plug $e^{10}$, so that in operation the piston-rod plays through a body of oil, and is thus kept constantly lubricated.

I do not limit myself to constructing the stuffing-boxes on the proximate heads of the cylinders in the manner shown in the leading figures—that is, with the moving element of the stuffing-box intruded into the cavity provided for the packing. On the contrary, such stuffing-boxes may be made in the more customary form of a cap, which encompasses the end of the boss, as illustrated in Fig. 3, such cap being therein indicated by reference-letter $E^a$. When this form of movable member for the stuffing-box is employed, the stop to limit the compression of the packing is necessarily applied outside the boss instead of outside the sleeve. Such stops are represented by the letters $e^2$ on Fig. 3. Instead of merely telescoping with the bosses, as in the forms illustrated, the movable member of the stuffing-boxes may be screwed into or onto the bosses, respectively, which constitute the fixed member of the box; but in that event the coupling need not be connected by right and left threads to the sleeves, respectively, but all the threads may be either right-hand or left-hand, as desired. Such a structure is illustrated in Fig. 4, in which I have shown the movable member of the stuffing-boxes in the form of a cap which is screwed outside of the boss, which constitutes the fixed member.

In any of the forms illustrated it may be found desirable to provide against leakage of oil through the threads of the coupling B', and for this purpose stuffing-boxes $A^4$ $A^4$ of suitable construction may be applied to the opposite ends of the coupling.

It will be evident that whatever be the form of construction in detail the two sleeves must be so constructed with relation to the coupling that they can be run into the latter far enough so that the entire structure comprised of the three parts—to wit, the two sleeves and the coupling—shall not exceed in length the distance between the proximate ends of the bosses on the heads of the cylinders.

I claim—

1. In a pressure-fluid motor, in which the reciprocating piston of the motor operates a reciprocating piston in a chamber where the work is done; closed connection between the motor-piston chamber and the secondary chamber, comprising stuffing-boxes on the proximate heads of such chambers respectively, each such stuffing-box consisting of one part rigid with the head of the chamber, and another part movable with respect thereto to compress the packing; a sleeve which rigidly and adjustably connects said movable parts, means by which the movable part of each stuffing-box is at all positions to which it may be adjusted with respect to the fixed member, positively stopped against longitudinal movement toward said fixed member.

2. In a pressure-fluid motor in which the reciprocating piston of the motor operates a reciprocating piston in a secondary chamber where the work is done; a closed connection between the motor piston-chamber and the secondary chamber comprising stuffing-boxes on the proximate heads of said chambers respectively, such stuffing-box consisting of the part rigid with respect to the chamber-head and a second part movable with respect to the first to compress the packing; adjustable stops on one of said parts to limit the compressing movement, and a coupling-sleeve connecting said two movable parts encompassing the piston-rod and forming an oil-chamber around the latter between the stuffing-boxes.

3. In a pressure-fluid motor, in which the reciprocating piston of the motor operates a reciprocating piston in a secondary chamber where the work is done; a closed connection between the motor piston-chamber and the secondary chamber, comprising stuffing-boxes on the proximate heads of such chambers respectively, and a right and left threaded coupling-sleeve connecting the movable parts of such stuffing-boxes respectively and encompassing the piston-rod between them and forming an oil-reservoir around them; and means by which the movable part of each such stuffing-box is, at all positions to which it may be adjusted with respect to the fixed member, positively stopped against longitudinal movement toward said members.

4. In a pressure-fluid motor in which the reciprocating piston operates; a reciprocating piston in a secondary chamber where the work is done; a closed connection between the motor piston-chamber and the secondary chamber consisting of stuffing-boxes on the proximate heads of said chambers; sleeves intruded into the stuffing-boxes respectively; a coupling which is screwed onto their proximate ends, and constitutes a closed connection between them and means by which the sleeves, at all positions to which they may be adjusted with respect to the boxes, are positively stopped against further intrusion into their boxes respectively.

5. In a pressure-fluid motor, in which the reciprocating piston of the motor operates a reciprocating piston in a secondary chamber where the work is done; a closed connection between the motor piston-chamber and the secondary chamber, comprising stuffing-boxes on the proximate heads of such chamber; the sleeves, E E intruded into such stuffing-boxes respectively, and oppositely threaded; a right-and-left interiorly-threaded coupling, E', screwed onto the proximate ends of said sleeves and comprising an oil-chamber between the intruded ends of the sleeves; and adjustable stops on such sleeves into the boxes respectively; whereby both sleeves are positively stopped against longitudinal movement in both directions at all positions to which they may be adjusted with respect to their boxes.

In testimony whereof I have hereunto set my hand, in the presence of two witnesses, at Chicago, Illinois, this 14th day of April, 1899.

WM. B. ERB.

Witnesses:
CHAS. S. BURTON,
JEAN ELLIOTT.